US 6,710,976 B2

(12) United States Patent
Chapin et al.

(10) Patent No.: US 6,710,976 B2
(45) Date of Patent: Mar. 23, 2004

(54) DISK HEAD SLIDER HAVING AIR BEARING PRESSURE RELIEF FEATURES

(75) Inventors: Mark A. Chapin, Louisiville, CO (US); Michael D. Mundt, Longmont, CO (US); Paul W. Smith, Niwot, CO (US)

(73) Assignee: Seagate Technology LLC, Scotts Valley, CA (US)

(*) Notice: Subject to any disclaimer, the term of this patent is extended or adjusted under 35 U.S.C. 154(b) by 279 days.

(21) Appl. No.: 09/970,213

(22) Filed: Oct. 3, 2001

(65) Prior Publication Data

US 2002/0060881 A1 May 23, 2002

Related U.S. Application Data

(60) Provisional application No. 60/237,905, filed on Oct. 4, 2000.

(51) Int. Cl.[7] .................................................. G11B 5/60
(52) U.S. Cl. ........................ 360/235.8; 360/236.3; 360/237; 360/236.1
(58) Field of Search ...................... 360/236.6, 235.8, 360/236.3, 237

(56) References Cited

U.S. PATENT DOCUMENTS

| 5,940,249 A | 8/1999 | Hendriks ..................... 360/103 |
| 6,466,410 B2 * | 10/2002 | Polycarpou et al. ..... 360/236.6 |
| 6,515,831 B1 * | 2/2003 | Sannino et al. .......... 360/235.6 |

* cited by examiner

Primary Examiner—A. J. Heinz
(74) Attorney, Agent, or Firm—Westman, Champlin & Kelly

(57) ABSTRACT

A disc head slider includes a slider body having a disc-facing surface, a recessed area positioned on the disc-facing surface, and a raised rail positioned on the disc-facing surface adjacent the recessed area. The raised rail includes a bearing surface and a recessed step surface which is recessed from the bearing surface and is raised from the recessed area. A plurality of bearing pads are formed on the recessed step surface and have upper surfaces that together define the bearing surface. A non-bearing pad is formed on the recessed step surface and has an upper surface, which is generally coplanar with the bearing surface, and a pointed leading pad edge.

25 Claims, 9 Drawing Sheets

DISK HEAD SLIDER HAVING AIR BEARING PRESSURE RELIEF FEATURES

CROSS-REFERENCE TO RELATED APPLICATION

This application claims the benefit of U.S. Provisional Application Serial No. 60/237,905, entitled "AIR BEARING PRESSURE RELIEF FEATURES," filed Oct. 4, 2000.

FIELD OF THE INVENTION

The present invention relates to disc drive data storage systems and, more particularly, to a disc head slider for carrying a read/write transducer within a disc drive.

BACKGROUND OF THE INVENTION

Disc drives are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised side rails, a cavity dam and a subambient pressure cavity. The leading taper is typically lapped or etched onto the end of the slider that is opposite to the recording head. The leading taper pressurizes the air as the air is dragged under the slider by the disc surface. The cavity dam provides an expansion path for the air to de-pressurize as it is dragged into the sub-ambient pressure cavity by the disc velocity. The expanded air in the cavity provides a self-loading force which forces the slider toward the disc surface. The counteraction between positive pressure developed along the side rails, the preload force provided by the suspension and the self-loading force provides the air bearing with a high vertical stiffness.

The physical separation between the slider and the disc surface at the recording head is an important parameter to disc drive performance. It is desired to minimize variation in the head clearance or "fly height" in response to various modes of vibration in the disc drive.

Rather than using the entire rail surface as a bearing surface, future slider designs may utilize many small bearing pads positioned on the rail surfaces which together form the overall bearing surface. These small bearing pads present surface contour changes along the rails which create pressure gradients over the small pad areas. It has been found that these pressure gradients can enhance vibration damping capabilities of the slider. In order to achieve high stiffness in addition to high damping, these pressure gradients are developed over small surface areas.

With current manufacturing processes, it is necessary to have relatively large surface areas on the bearing surface for making process control measurements such as optical fly height measurements and slider surface curvature measurements. The small bearing pads may not be sufficiently large to make these measurements accurately or may be in the wrong locations. Additional, larger air bearing pads would then need to be added to the rail surfaces to allow for the process control measurements. However, these large air bearing pads would generate pressure over large surface areas, which would in turn generate a large amount of upward force on the slider. To compensate for this large upward force, a number of the small damping features would need to be removed so that the slider would fly at the correct flying height. By removing the damping features, the air bearing would have a reduction in damping performance.

A slider is therefore desired which has high stiffness and damping performance while providing reference surfaces that can be used for measuring fly height and slider curvature. The present invention addresses these and other problems, and offers other advantages over the prior art.

SUMMARY OF THE INVENTION

One embodiment of the present invention relates to a disc head slider which includes a slider body having a disc-facing surface, a recessed area positioned on the disc-facing surface, and a raised rail positioned on the disc-facing surface adjacent the recessed area. The raised rail includes a bearing surface and a recessed step surface which is recessed from the bearing surface and is raised from the recessed area. A plurality of bearing pads are formed on the recessed step surface and have upper surfaces that together define the bearing surface. A non-bearing pad is formed on the recessed step surface, has an upper surface, which is generally coplanar with the bearing surface, and has a pointed leading pad edge.

Another embodiment of the present invention relates to a disc head slider which includes a slider body having a disc-facing surface, a recessed area positioned on the disc-facing surface, and a raised rail positioned on the disc-facing surface adjacent the recessed area. The raised rail includes a bearing surface and a recessed step surface which is recessed from the bearing surface and is raised from the recessed area. A plurality of bearing pads are formed on the recessed step surface and have upper surfaces that together define the bearing surface. A non-bearing pad is formed on the recessed step surface, has an upper surface, which is generally coplanar with the bearing surface, and has a leading pad edge and lateral side edges. A moat is recessed into the recessed step surface and extends along the leading pad edge and the lateral side edges of the non-bearing pad.

Yet another embodiment of the present invention relates to a disc head slider which includes a disc-facing surface, a recessed area positioned on the disc-facing surface, and a first raised rail positioned on the disc-facing surface adjacent the recessed area. The first raised rail includes multiple coplanar bearing surfaces and a non-bearing reference surface which is coplanar with the multiple bearing surfaces and is substantially isolated from air flow along the first raised rail.

DETAILED DESCRIPTION OF ILLUSTRATIVE EMBODIMENTS

Figure 1:
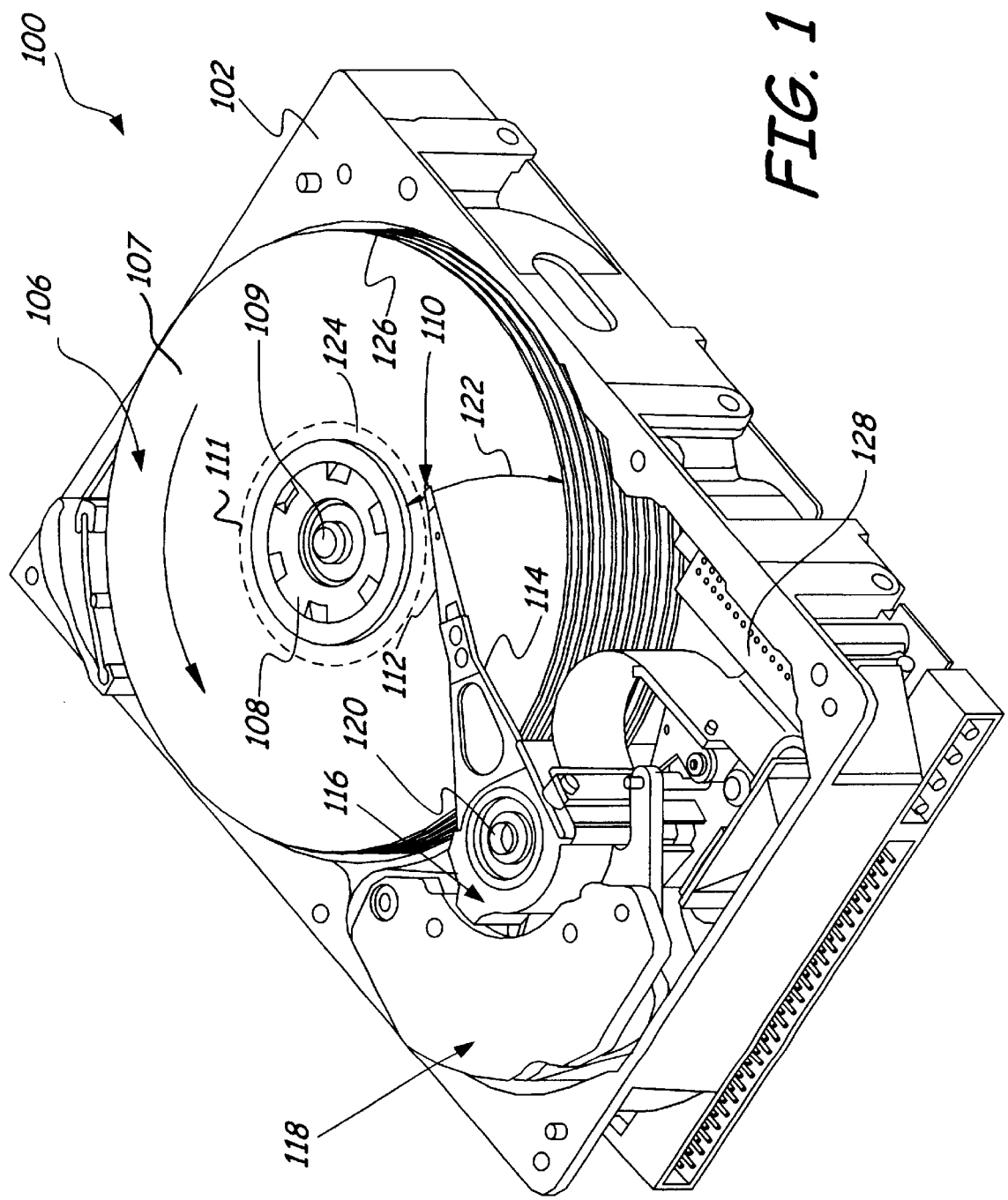
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

During operation, as discs 107 rotate, the discs drag air under the respective sliders 110 and along their bearing surfaces in a direction approximately parallel to the tangential velocity of the discs. As the air passes beneath the bearing surfaces, air compression along the air flow path causes the air pressure between the discs and the bearing surfaces to increase, which creates a hydrodynamic lifting force that counteracts the load force provided by suspensions 112 and causes the sliders 110 to lift and fly above or in close proximity to the disc surfaces.

As discussed in more detail below, slider 110 has non-bearing reference pads for providing surfaces that can be used for process control metrics, such as optical fly height measurements and crown and cross curvature measurements, while producing substantially no positive pressure on those surfaces during operation. This is accomplished by diverting air flow around the reference pads. Substantially all of the positive pressure is developed over multiple small bearing pads rather than the reference pads. These small bearing pads provide multiple high pressure gradients that increase damping performance and pitch and roll stiffness of the slider.

Figure 2:
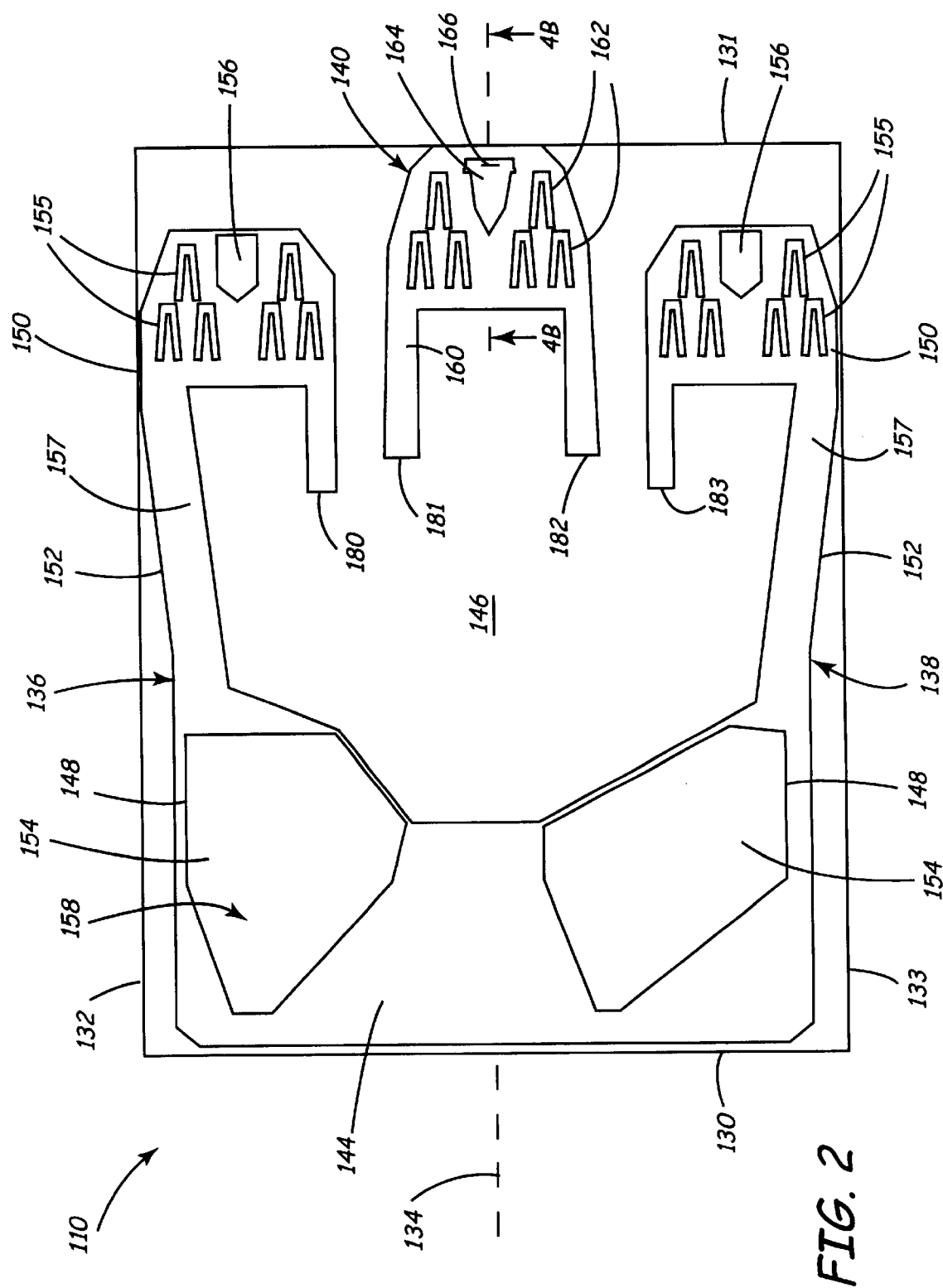
FIG. 2 is a bottom plan view of a slider shown in FIG. 1, as viewed from the surface of a disc according to one embodiment of the present invention.

FIG. 2 is a bottom, plan view of one of the sliders 110 as viewed from the disc surface, according to one embodiment of the present invention. Slider 110 has a leading slider edge 130, a trailing slider edge 131, slider side edges 132 and 133 and a lateral center line or longitudinal axis 134. In the embodiment shown in FIG. 2, slider 110 has a length along side edges 132 and 133 of 1.25 millimeters (mm) and a width along leading and trailing edges 130 and 131 of 1.0 mm. This slider size is often referred to as a "picoslider" size. However, other larger and smaller slider sizes can also be used with the present invention.

Slider 110 further includes a pair of elongated side rails 136 and 138, a center rail 140, a cavity dam 144 and a recessed area 146, which is known as a subambient pressure cavity. Side rails 136 and 138 are positioned along side edges 132 and 133, respectively, and are disposed about cavity 146. Rails 136 and 138 extend generally parallel to lateral center line 134, from leading slider edge 130 toward trailing slider edge 131, and terminate prior to trailing slider edge 131. The term "generally parallel" as used in the specification and claims includes rails that are parallel to center line 134 and rails that are somewhat skewed relative to center line 134.

Each rail 136 and 138 has a leading section 148, a trailing section 150 and a waist section 152. Leading section 148 includes a relatively large leading bearing pad 154, and trailing section 150 includes a plurality of small trailing bearing pads 155 and a non-bearing reference pad 156. Pads 154, 155 and 156 are positioned on a recessed step surface 157. In one embodiment, recessed step surface 157 is recessed from the upper surfaces of pads 154, 155 and 156 by a step depth of about 0.1 micrometers (um) to 0.3 um, for example. Recessed step surface 157 is raised from the floor of cavity 146.

The upper surfaces of pads 154, 155 and 156 are generally coplanar with one another. However as described in more detail below, only leading pad 154 and trailing pads 155 form part of an overall bearing surface 158 on slider 110. Due to the shape of non-bearing reference pad 156, local airflow is diverted around pad 156 so that it does not develop significant positive pressure during operation.

Pads 155 present multiple surface transitions to local fluid flow causing multiple pressure gradients along the flow. It has been found that large pressure gradients lead to increased vibration damping performance and that high pitch and roll stiffness can be achieved if the pressure gradients are distributed over small surface areas on the slider. The pressure gradients developed by pads 155 dampen roll mode type vibrations in slider 110 at the slider's natural resonance frequencies and provide increased roll stiffness.

Cavity dam 144 extends along leading slider edge 130, between side rails 136 and 138 for defining subambient pressure cavity 146, which trails cavity dam 144 relative to a direction of air flow from leading slider edge 130 toward trailing slider edge 131. In one embodiment, cavity dam 144 is generally parallel to and recessed from bearing surface 158 by the step depth of 0.1 um to 0.3 um, for example. Other depths can also be used. Alternatively, cavity dam 144 can be formed as a leading taper or otherwise profiled surface. Subambient pressure cavity 146 is recessed from bearing surface 158 by a "cavity depth" of 1 um to 3 um, for example.

Center rail 140 is positioned along trailing slider edge 131 and is centered along lateral center line 134. In alternative embodiments, center rail 140 can be skewed or offset with respect to line 134. Center rail 140 has a recessed step surface 160, a plurality of small bearing pads 162 and a larger non-bearing reference pad 164. Bearing pads 162 and non-bearing pad 164 have upper surfaces that are generally coplanar with one another and with bearing surface 158. Recessed step surface 160 is generally parallel to and recessed from the upper surfaces of pads 162 and 164 by the step depth of 0.1 um to 0.3 um, for example. Recessed step surface 160 provides pressurization of bearing pads 162 from air flow venting from cavity 146. However, similar to reference pad 156, reference pad 164 has a shape that diverts local air flow around the pad so that the pad does not develop any substantial pressure during operation. Thus, only the small bearing pads 162 on center rail 140 form part of the overall bearing surface 158 of slider 110.

Center rail 140 supports a read/write transducer 166 along trailing slider edge 131. In alternative embodiments, transducer 166 can be positioned at other locations on slider 110. However, when placed at or near trailing slider edge 131, transducer 166 is located at the closest point on slider 110 to the surface of disc 107 (shown in FIG. 1) when slider 110 flies with a positive pitch angle. With a positive pitch angle, trailing slider edge 131 is closer to the surface of disc 107 than leading slider edge 130.

Similar to pads 155, pads 162 present multiple surface transitions to local fluid flow causing multiple pressure gradients to be developed along center rail 140. These pressure gradients dampen trailing edge pitch mode type vibrations in slider 110 at the slider's natural resonance frequencies and provide increased pitch stiffness.

Figure 3:
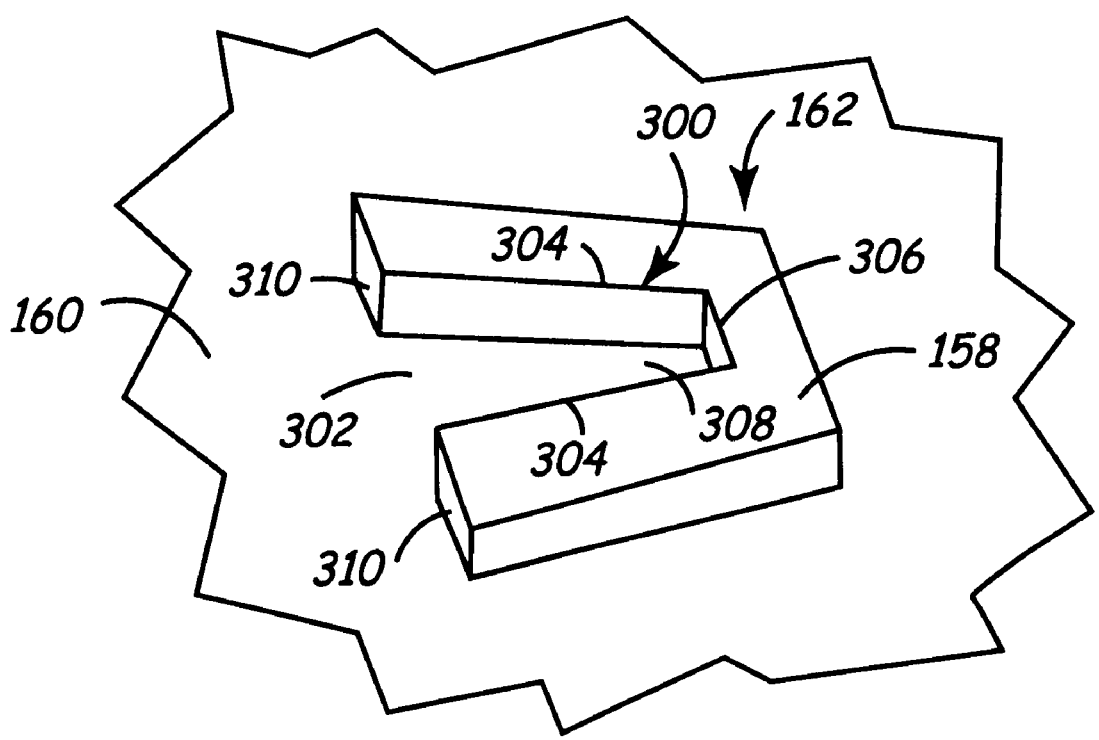
FIG. 3 is a fragmentary, perspective view illustrating a bearing pad on the slider shown in FIG. 2.

FIG. 3 is a fragmentary, perspective view illustrating one of the bearing pads 162 in greater detail. Bearing pads 155 on side rails 136 and 138 have similar structures as bearing pads 162. Each bearing pad 162 extends vertically from recessed stepped surface 160 and includes a convergent channel feature or "trench" 300, which is recessed within the pad.

Convergent channel 300 has a leading channel end 302, channel side walls 304, a trailing channel end 306 and a channel floor 308. Channel floor 308 can be coplanar and contiguous with recessed step surface 160 as shown in FIG. 3 or can have other depths in alternative embodiments. For example, channel floor 308 can have a depth measured from bearing surface 158 of 0.1 to 0.3 micrometers. Also, channel floor 308 can be tapered such that the depth of channel floor 308 decreases from leading channel end 302 toward trailing channel end 306. Convergent channel 300 also has a side wall 310 to either side of leading channel end 302.

Convergent channels 300 are formed through photolithography processes such ion milling, chemical etching or reactive ion etching (RIE). With this processes, the depth and location of the channels can be accurately controlled.

In each channel 300, leading channel end 302 is open to fluid flow from recessed step surface 160 and trailing channel end 306 is closed to the fluid flow. During operation, side walls 310 to either side of leading channel end 302 present themselves as a substantial pressure rise to the local fluid flow. Since the opening to each channel 300 does not have the same pressure rise, it is seen as a preferential path for the fluid to flow. Once the fluid flow enters channel 300, the flow is essentially bounded by channel side walls 304 and trailing channel end 306 and is forced to rise over trailing channel end 306, forming a "convergent" channel for the flow. This creates a localized positive pressure gradient at a discrete region on the bearing surface, rearward of trailing channel end 306.

The localized pressure gradients developed on pads 162 yield high peak pressures along the trailing surfaces of the pads, which increase the pitch stiffness of slider 110. The high pressure gradients also provide an energy dissipation mechanism during slider vibration, which dampens trailing edge pitch mode type vibrations at the slider's natural resonance frequencies. The channels formed in pads 155 on side rails 136 and 136 (shown in FIG. 2) operate in a similar fashion to dampen roll mode type vibrations and increase roll stiffness as mentioned above.

Channels 300 can be symmetrical about lateral center line 134 (shown in FIG. 2) or can be asymmetrical to provide preferential pressurization at certain skew angles. Referring back to FIG. 2, side rails 136 and 138 and center rail 140 further include arms 180–183 for further funneling air flow from cavity 146 into the channels in bearing pads 155 and 162.

It is preferential that all positive pressure developed on the trailing sections of side rails 136 and 138 and on center rail 140 be distributed over the small bearing pads 155 and 162 only, which have small surface areas. However, with current manufacturing processes, it is often necessary to have a large reference pad, such as reference pads 156 and 164 on process control measurements can be made. For example, pads 156 can be used for making measurements of the cross and camber curvatures of the overall bearing surface 158. Pad 164 can be used for making optical fly height measurements near the read/write transducer 166.

In a conventional slider, large reference pads would generate positive pressure over large areas, which in turn would generates a large amount of upward force on the slider. To compensate for this large upward force, a number of the damping features 155 and 162 would need to be removed so that the slider would fly at the correct height. However, removing the damping features would cause a reduction in damping performance. To alleviate this problem, reference pads 156 and 164 have a geometry that minimizes pressurization on the upper surfaces of the pads.

Figure 4A:
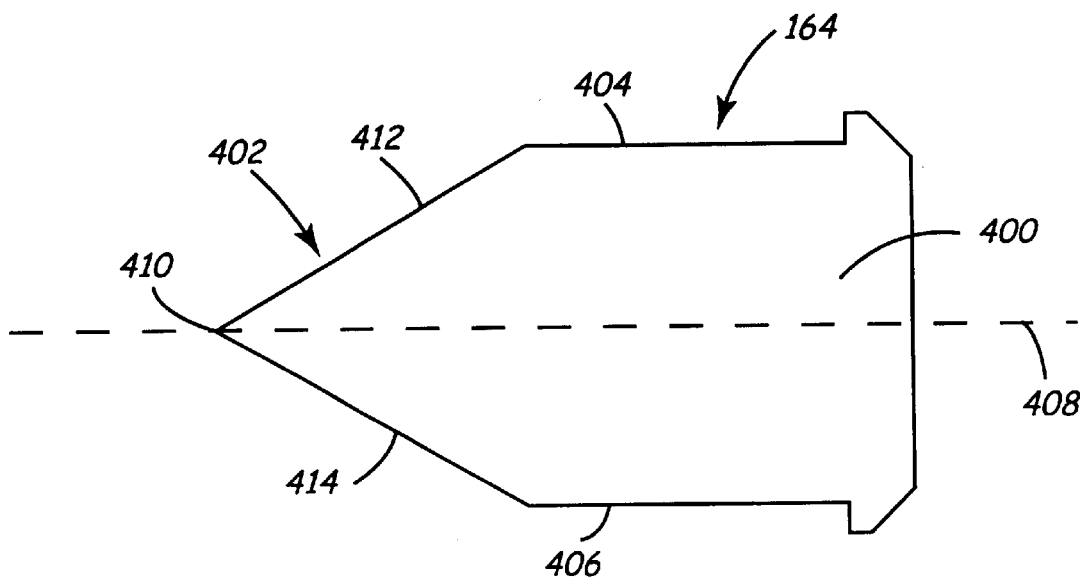
FIG. 4A is a top plan view which illustrates a non-bearing reference pad on the slider shown in FIG. 2.
Figure 4B:
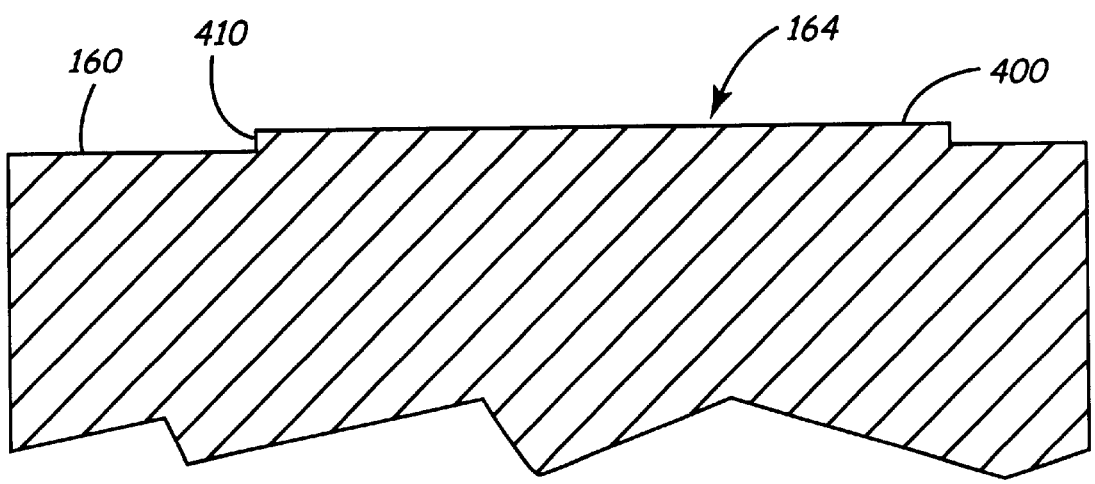
FIG. 4B is a cross-sectional view of the reference pad taken along lines 4B—4B of FIG. 2.

FIG. 4A is a top plan view which illustrates reference pad 164 in greater detail. FIG. 4B is a cross-sectional view of reference pad 164 taken along lines 4B—4B of FIG. 2. Reference pads 156 have a similar structure. Reference pad 164 has an upper surface 400, a leading pad edge 402, side pad edges 404 and 406 and a trailing pad edge 408. Leading pad edge 402 includes first and second edge segments that join and form a point at an apex 410. In one embodiment, first and second edge segments 412 and 414 diverge from apex 410 at angles of less than +/−45 degrees, respectively, relative to a lateral axis 416 of reference pad 164. With the pointed configuration shown in FIG. 4, leading pad edge 402 diverts local air flow around reference pad 164 so that substantially no positive pressure is developed along upper surface 400.

In alternative embodiments, leading pad edge 402 can have a variety of other pointed configurations, which can be curved or rectilinear for example.

Figure 5:
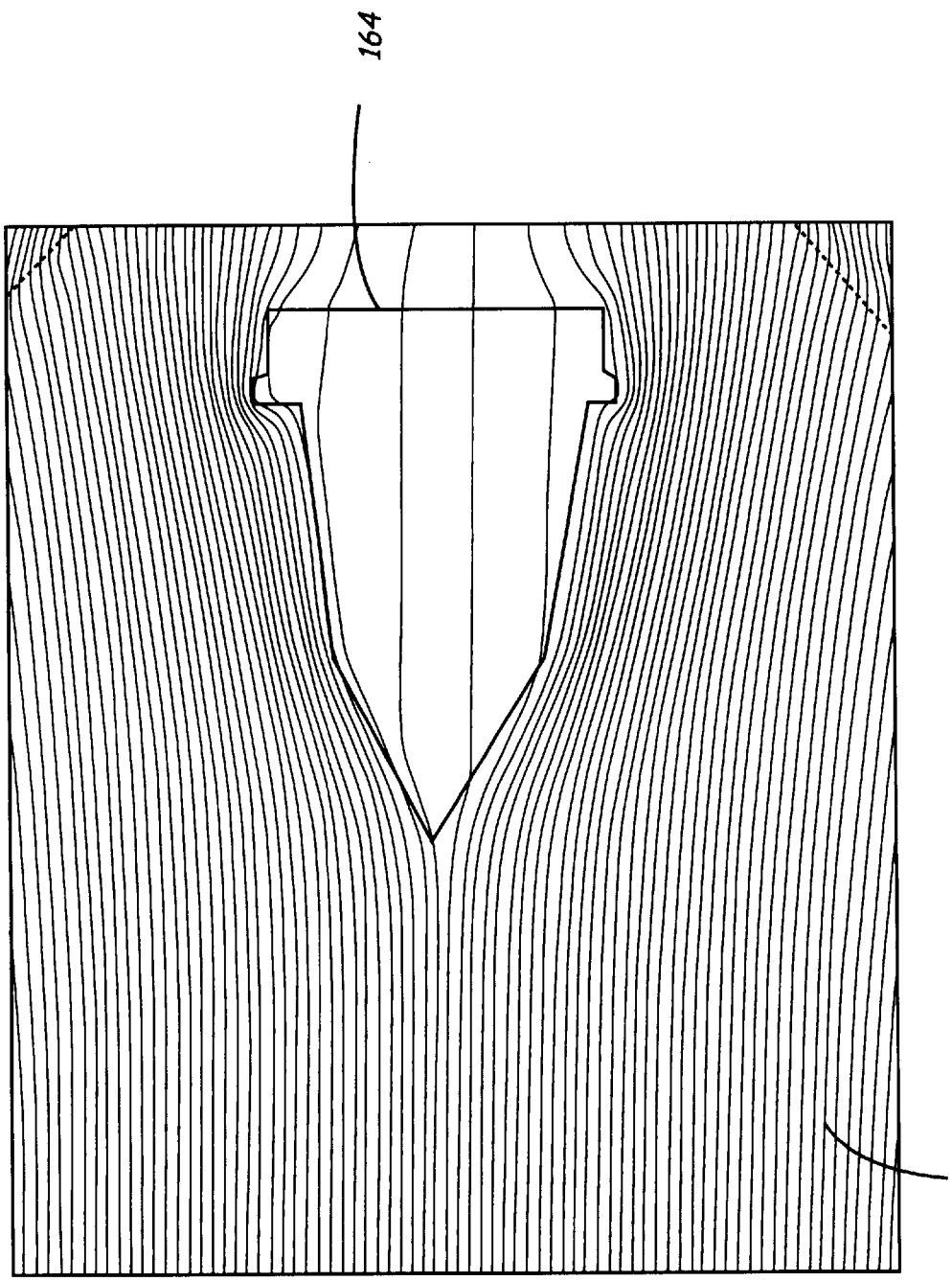
FIG. 5 is a diagram illustrating air flow stream lines around the reference pad shown in FIGS. 4A and 4B when the slider is at a zero skew angle.

FIG. 5 is a diagram illustrating air flow stream lines 500 around reference pad 164 when the lateral center line 134 (shown in FIG. 2) of slider 110 is at a zero skew angle with respect to the tangential velocity of disc rotation. As shown in FIG. 5, there is a significant amount of air flow diverted around reference pad 164. Reference pads 156 on side rails 136 and 136 behave in a similar fashion. As a result, reference pads 156 and 164 do not develop a significant amount of positive pressure under these operating conditions.

Computer simulations were performed to obtain examples of actual pressures developed on the reference pads under a given operating condition. The fly height of slider 110 was fixed at 0.5 microinches, with 150 micro radians of pitch and zero roll. The static pressure distribution on each reference pad 156 and 164 was then calculated. As seen from Table 1 below, the pointed shape of leading pad edge 402 was effective in reducing the force developed on the reference pads.

TABLE 1

SLIDER 110: ZERO SKEW

| Pad Location | Force (grams) |
| --- | --- |
| Outer rail reference pad 156 | 0.147 |
| Center rail reference pad 164 | 0.144 |
| Inner rail reference pad 156 | 0.142 |

Figure 6:
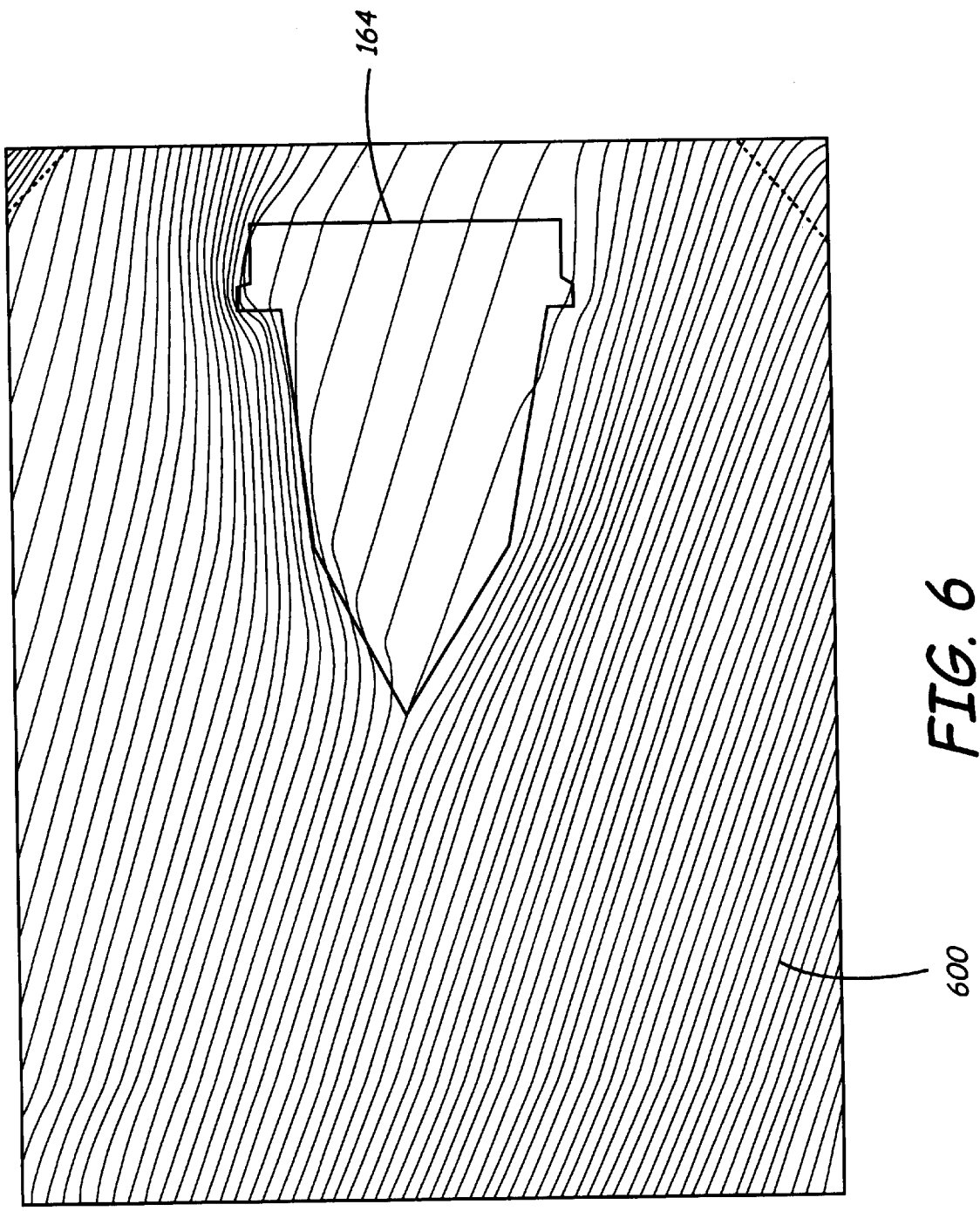
FIG. 6 is a diagram illustrating air flow stream lines around the reference pad shown in FIGS. 4A and 4B when the slider is at a positive skew angle.

While slider 110 is at the outer diameter of the disc, the slider is at a large positive skew angle relative to the flow. FIG. 6 is a diagram which illustrates the stream lines 600 of local fluid flow when slider 110 is at a positive skew angle. As shown in FIG. 6, the pointed leading pad edge 402 of reference pad 164 is less effective in diverting air flow from the upper surface 400 of the pad when slider 110 is at skew. Reference pads 156 behave in a similar fashion.

Table 2 shows the force developed on reference pads 156 and 164 under the operating conditions shown in FIG. 6, which is greater than the force developed at zero skew.

TABLE 2

SLIDER 110: POSITIVE SKEW

| Pad Location | Force (grams) |
| --- | --- |
| Outer rail reference pad 156 | 0.327 |
| Center rail reference pad 164 | 0.308 |
| Inner rail reference pad 156 | 0.256 |

It is therefore desirable in some embodiments of the present invention to further reduce the force developed on reference pads 156 and 164 by further isolating these pads from local fluid flow.

Figure 7:
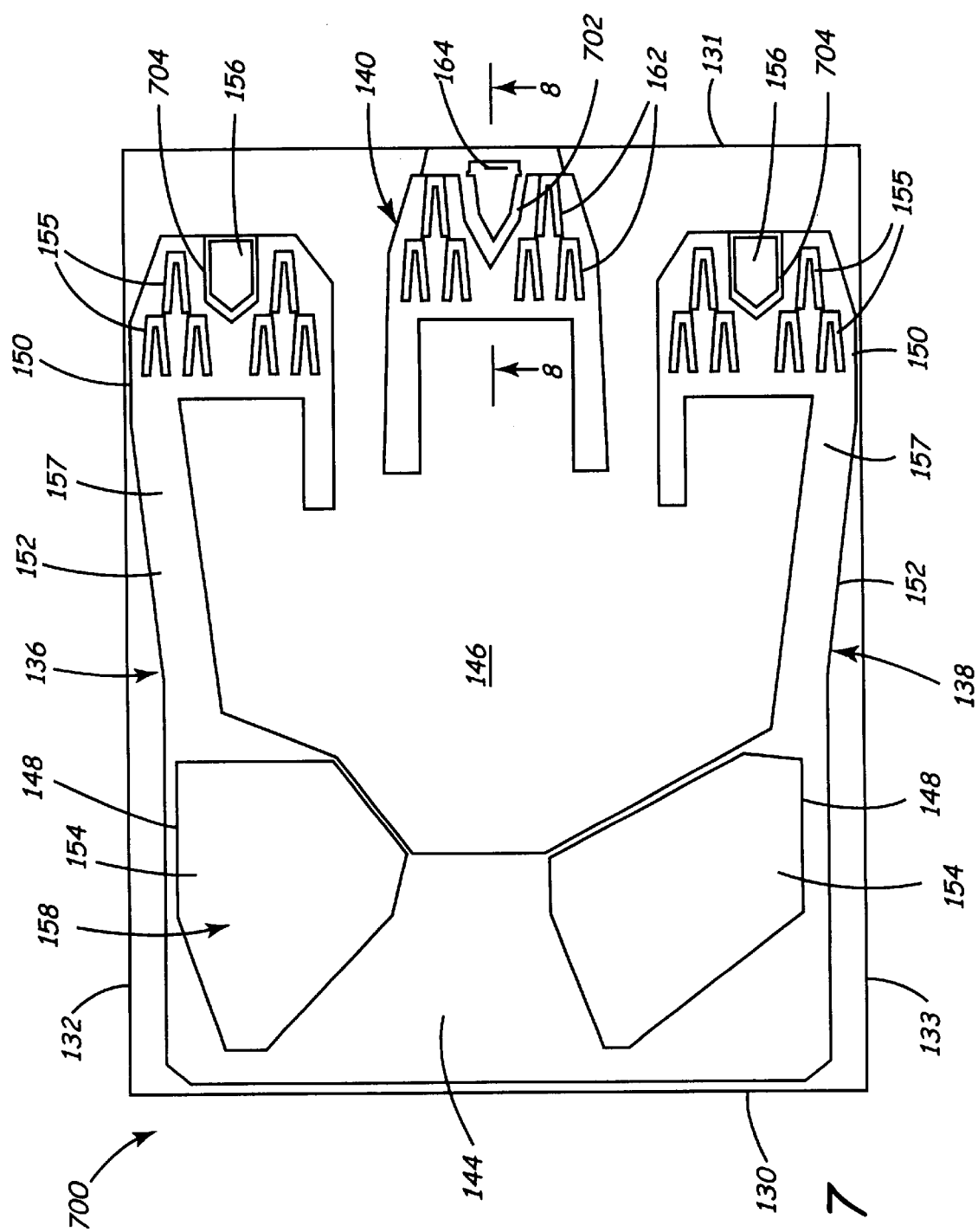
FIG. 7 is a bottom plan view of a slider according to an alternative embodiment of the present invention.

FIG. 7 is a top plan view of a slider 700 according to an alternative embodiment of the present invention which further isolates the non-bearing reference pads from local air flow. The same reference numerals are used in FIG. 7 as were used in FIG. 2 for the same or similar elements.

In the embodiment shown in FIG. 7, center rail 140 further includes a moat 702 which substantially surrounds non-bearing reference pad 164, and side rails 136 and 138 further include moats 704 which substantially surround non-bearing reference pads 156. Moats 702 and 704 extend along the leading and side pad edges of reference pads 156 and 164 and vent to the trailing edges of the rails. Moats 702 and 704 have depths that are greater than the depths of recessed step surfaces 157 and 160 relative to bearing surface 158.

In one embodiment, moats 702 and 704 have depths measured from bearing surface 158 that are at least 75% of the depth of cavity 146. However, other depths can also be used in alternative embodiments. Moats 702 and 704 can have widths of 10 micrometers to 20 micrometers, for example. Other widths can also be used.

During operation, moats 702 and 704 present themselves as preferential paths for fluid flow. As a result, local fluid flow is diverted around reference pads 156 and 164, rather than over the pads. This further minimizes the pressure developed on reference pads 156 and 164 when slider 700 is both at zero skew and at positive skew with respect to the disc tangential velocity.

Figure 8:
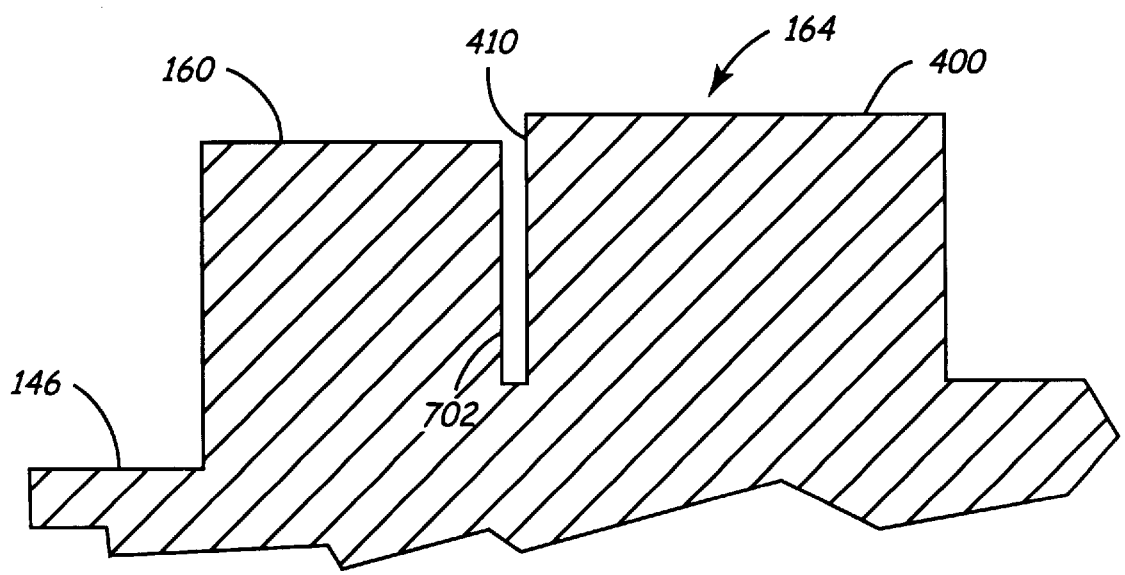
FIG. 8 is a cross-sectional view of a reference pad and moat taken along lines 8—8 of FIG. 7.

FIG. 8 is a cross-sectional view of center rail 140 which is taken along lines 8—8 of FIG. 7. As shown in FIG. 8, moat 702 is significantly deeper than recessed step surface 160 and therefore allows local airflow to expand into the moat and be diverted along the sides of reference pad 164 rather than over the upper surface 400 of the pad.

Figure 9:
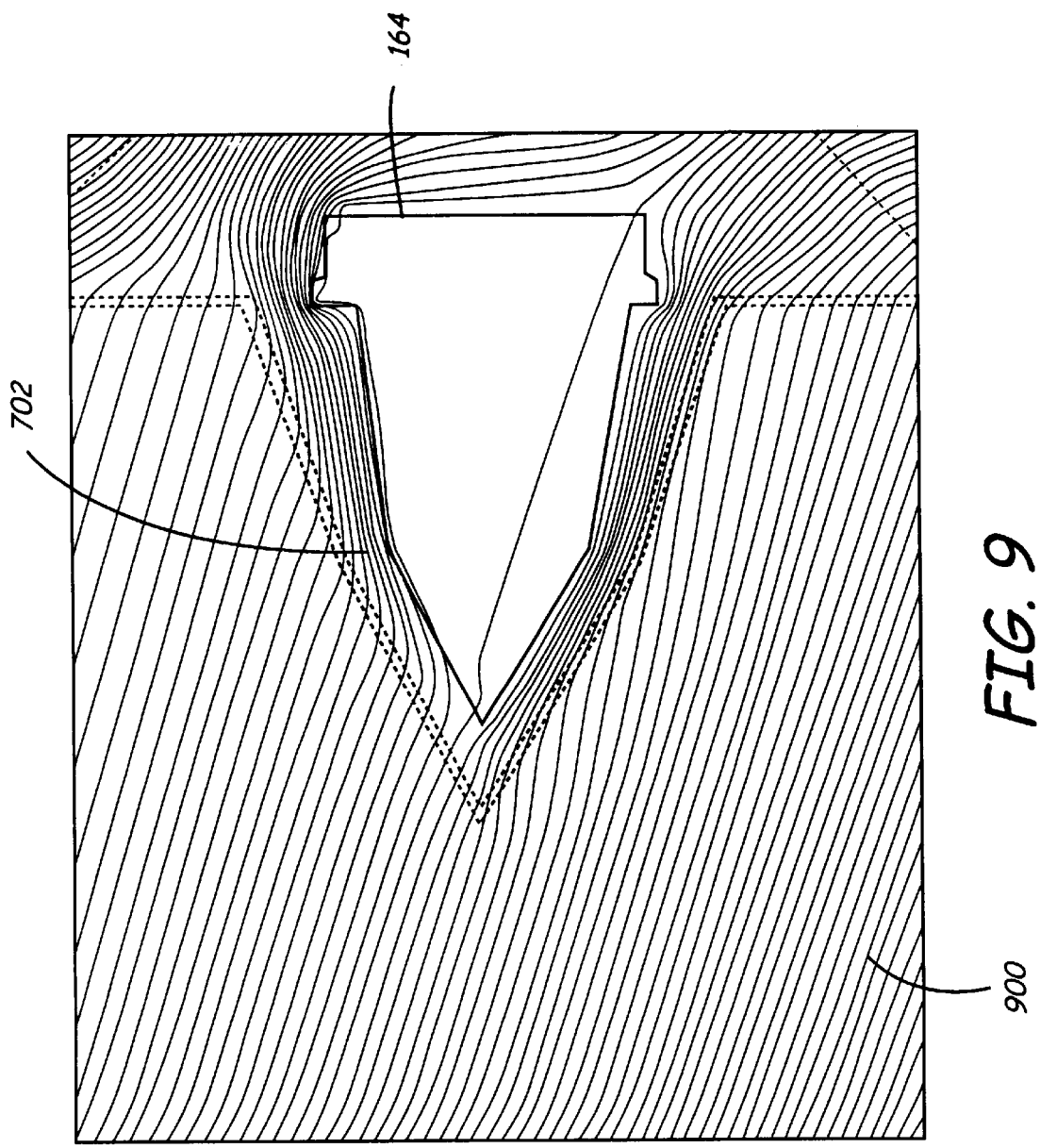
FIG. 9 is a diagram illustrating air flow stream lines around the reference pad shown in FIGS. 7 and 8 when the slider is at a positive skew angle.

FIG. 9 is a diagram illustrating the local airflow stream lines 900 around reference pad 164 when slider 700 is at a positive skew angle with respect to the disc tangential velocity. Even when slider 700 has a positive skew angle, the local airflow represented by stream lines 900 is diverted around reference pad 164 by moat 702 and vents to the trailing edge of the slider.

Table 3 shows the force developed on reference pads 156 and 164 when slider 700 has the positive skew angle shown in FIG. 9.

TABLE 3

SLIDER 700 WITH MOAT: POSITIVE SKEW

| Pad Location | Force (grams) |
| --- | --- |
| Outer rail reference pad 156 | 0.025 |
| Center rail reference pad 164 | 0.021 |
| Inner rail reference pad 156 | 0.025 |

The positive pressure developed on the reference pads is significantly reduced with respect to the pressure developed on the reference pads with no moat as shown in FIG. 2. This reduction in pressure reduces the overall air bearing force on slider 700 from 4.2 grams (for the slider shown in FIG. 2) down to 2.9 grams. This is significant since the reduction in force allows more damping features, such as bearing pads 155 and 162, to be added to the rails which can further increase the damping performance of the slider. For highly damped air bearing designs, the desire is to distribute all of the positive pressure over the damping features and not over the reference pads that are strictly used for process control metrics. This way, a large number of bearing pads 155 and 162 can be used to maximize vibration dampening performance while maintaining a sufficiently low fly height.

The small bearing pads, the non-bearing reference pads and the moats can be located at various positions on the slider surfaces and rails and can have various geometries in alternative embodiments of the present invention. The positions shown in FIGS. 2 and 7 are provided as examples only. Additional features can be added or removed from the overall bearing geometry in alternative embodiments. In one embodiment, an additional discrete pad is added along the recessed waist section of the side rails to limit stiction between the slider and the disc surface. Also, the particular rail configurations can vary widely from those shown in the above figures. The side rails can be elongated as shown in FIGS. 2 and 7 or can include separate, discrete leading and trailing rail sections. Center rail 140 can be a discrete island or can be an elongated rail, which connects to the cavity dam. The slider can be configured as a negative pressure air bearing (NPAB) slider or a positive pressure air bearing (PPAB) slider. Other variations can also be made.

In summary, one aspect of the embodiment of the present invention relates to a disc head slider 110, 700 which includes a slider body having a disc-facing surface, a recessed area 146 positioned on the disc-facing surface, and a raised rail 136, 138, 140 positioned on the disc-facing surface adjacent the recessed area 146. The raised rail 136, 138, 140 includes a bearing surface 158 and a recessed step surface 157, 160 which is recessed from the bearing surface 158 and is raised from the recessed area 146. A plurality of bearing pads 155, 162 are formed on the recessed step surface 157, 160 and have upper surfaces that together define the bearing surface 158. A non-bearing pad 156, 164 is formed on the recessed step surface 157, 160, has an upper surface 400, which is generally coplanar with the bearing surface 158, and has a pointed leading pad edge 402.

Another embodiment of the present invention relates to a disc head slider 110, 700 which includes a slider body having a disc-facing surface, a recessed area 146 positioned on the disc-facing surface, and a raised rail 136, 138, 140 positioned on the disc-facing surface adjacent the recessed area 146. The raised rail 136, 138, 140 includes a bearing surface 158 and a recessed step surface 157, 160 which is recessed from the bearing surface 158 and is raised from the recessed area 146. A plurality of bearing pads 155, 162 are formed on the recessed step surface 157, 160 and have upper surfaces that together define the bearing surface 158. A non-bearing pad 156, 164 is formed on the recessed step surface 157, 160, has an upper surface 400, which is generally coplanar with the bearing surface 158, and has a leading pad edge 402 and lateral side edges 404, 406. A moat 702, 704 is recessed into the recessed step surface 157, 160 and extends along the leading pad edge 402 and the lateral side edges 404, 406 of the non-bearing pad 156, 164.

Yet another embodiment of the present invention relates to a disc head slider 110, 700 which includes a disc-facing surface, a recessed area 146 positioned on the disc-facing surface, and a first raised rail 136, 138, 140 positioned on the disc-facing surface adjacent the recessed area 146. The first raised rail 136, 138, 140 includes multiple coplanar bearing surfaces 154, 155, 162 and a non-bearing reference surface 156, 164 which is coplanar with the multiple bearing surfaces 154, 155, 162 and is substantially isolated from air flow along the first raised rail 136, 138, 140.

Although the present invention has been described with reference to preferred embodiments, workers skilled in the art will recognize that changes may be made in form and detail without departing from the spirit and scope of the invention. Also, the slider of the present invention can be used with various types of transducers, such as magnetic heads, magneto-resistive heads, and optical heads.

What is claimed is:

1. A slider comprising:
   a bottom surface;
   a recessed area positioned on the bottom surface; and
   a first raised rail positioned on the bottom surface and comprising:
      a bearing surface;
      a recessed step surface which is recessed from the bearing surface and is raised from the recessed area;
      a bearing pad formed on the recessed step surface and having an upper surface that defines the bearing surface;
      a non-bearing pad formed on the recessed step surface and having an upper surface and a pointed leading pad edge; and
      a moat, which is recessed into the recessed step surface and extends along the leading pad edge and along first and second lateral edges of the non-bearing pad.

2. The slider of claim 1 wherein the non-bearing pad is generally coplanar with the bearing surface.

3. The slider of claim 1 wherein the moat has a depth measured from the bearing surface which at least 75% of a depth of the recessed area.

4. The slider of claim 1 wherein the moat has the shape of a recessed channel having a channel width of 10 micrometers to 20 micrometers.

5. The slider of claim 1 wherein the non-bearing pad is positioned along a trailing edge of the first raised rail and the moat vents to the trailing edge of the first raised rail.

6. The slider of claim 1 wherein the leading pad edge has an apex and first and second edge segments that join at the apex and diverge from the apex at less than +−45 degrees, respectively, relative to a lateral axis of the non-bearing pad.

7. The slider of claim 1 wherein the bearing pads comprises a convergent channel having a leading channel end open to fluid flow from the recessed step surface, channel side walls, and a trailing channel end closed to the fluid flow from the recessed step surface.

8. The slider of claim 1 wherein the first raised rail further comprises a plurality of bearing pads, including the first mentioned bearing pad, which are formed on the recessed step surface and have upper surfaces that together define the bearing surface, and wherein the plurality of bearing pads are discrete from one another.

9. The slider of claim 8 wherein:
   the upper surfaces of the bearing pads each have a surface area; and
   the upper surface of the non-bearing pad has a surface area that is greater than the surface area of each of the bearing pads.

10. The slider of claim 8 wherein the first raised rail is a center rail that is positioned along a lateral center line of the bottom surface, at a trailing edge of the bottom surface.

11. The slider of claim 10 wherein the recessed step surface covers the entire center rail except at the bearing pads and the non-bearing pad such that the only surfaces on the center rail that form part of the bearing surface include the upper surfaces of the bearing pads.

12. The slider of claim 1 wherein:
   the first raised rail extends generally along a lateral side edge of the bottom surface and further comprises a leading section, a trailing section and a narrow waist section extending from the leading section to the trailing section;
   the bearing pad and the non-bearing pad are formed on the trailing section; and
   the leading section comprises a raised leading bearing pad formed on the recessed step surface and having an upper surface which is generally coplanar with the upper surface of the bearing pad on the trailing section.

13. The slider of claim 12 wherein the first raised rail further comprises a plurality of bearing pads, including the first mentioned bearing pad, which are formed on the recessed step surface and have upper surfaces, and wherein the recessed step surface covers the entire first rail except at the leading bearing pad, the bearing pads on the trailing section and the non-bearing pad such that the only surfaces on the first rail that form part of the bearing surface include the upper surfaces of the leading bearing pad and the bearing pads on the trailing section.

14. The slider of claim 1 and further comprising a second raised rail positioned on the bottom surface on an opposite side of the recessed area than the first raised rail, wherein the second raised rail comprises:
 a second bearing surface;
 a second recessed step surface which is recessed from the second bearing surface and is raised from the recessed area;
 a second bearing pad formed on the second recessed step surface and having an upper surface that defines the second bearing surface; and
 a second non-bearing pad formed on the second recessed step surface and having an upper surface and a pointed leading pad edge.

15. The slider of claim 14 and further comprising a cavity dam extending between the first and second raised rails.

16. A disc head slider comprising:
 a slider body having a disc-facing surface with a leading slider edge and a trailing slider edge;
 a recessed area positioned on the disc-facing surface; and
 a first raised rail positioned on the disc-facing surface adjacent the recessed area and comprising:
  a bearing surface;
  a recessed step surface which is recessed from the bearing surface and is raised from the recessed area;
  a plurality of bearing pads formed on the recessed step surface and having upper surfaces that together define the bearing surface;
  a non-bearing pad formed on the recessed step surface and having an upper surface, which is generally coplanar with the bearing surface, a leading pad edge and lateral side edges; and
  a moat which is recessed into the recessed step surface and extends along the leading pad edge and the lateral side edges of the non-bearing pad.

17. The disc head slider of claim 16 wherein the leading pad edge is pointed.

18. The disc head slider of claim 17 wherein the leading pad edge has an apex and first and second edge segments that join at the apex and diverge from the apex at less than +/−45 degrees, respectively, relative to a lateral axis of the non-bearing pad.

19. The disc head slider of claim 16 wherein the moat has a depth measured from the bearing surface which at least 75% of a depth of the recessed area.

20. The disc head slider of claim 16 wherein the moat has the shape of a recessed channel having a channel width of 10 micrometers to 20 micrometers.

21. The disc head slider of claim 16 wherein the non-bearing pad is positioned along a trailing edge of the first raised rail and the moat vents to the trailing edge of the first raised rail.

22. The disc head slider of claim 16 wherein each of the bearing pads comprises a convergent channel having a leading channel end open to fluid flow from the recessed step surface, channel side walls, and a trailing channel end closed to the fluid flow from the recessed step surface.

23. A slider comprising:
 a bottom surface;
 a recessed area positioned on the bottom surface; and
 a first raised rail positioned on the bottom surface; and
 means positioned on the first raised rail for forming multiple bearing surfaces and a non-bearing reference surface which is substantially isolated from air flow along the first raised rail by a moat that extends along a leading edge of the non-bearing reference surface and lateral side edges of the non-bearing reference surface.

24. The slider of claim 23 wherein:
 the first raised rail comprises a recessed step surface which is recessed from the multiple bearing surfaces and is raised from the recessed area;
 the means for forming multiple coplanar bearing surfaces comprises a plurality of bearing pads formed on the recessed step surface and having upper surfaces that define the multiple bearing surfaces;
 the means for forming the non-bearing reference surface comprises:
  a non-bearing pad formed on the recessed step surface and having an upper surface, which is generally coplanar with the multiple bearing surfaces; and
  the moat which is recessed into the recessed step surface.

25. The slider of claim 23 wherein:
 the first raised rail comprises a recessed step surface which is recessed from the multiple bearing surfaces and is raised from the recessed area;
 the means for forming the non-bearing reference surface comprises:
  a non-bearing pad formed on the recessed step surface and having an upper surface, which is generally coplanar with the multiple bearing surfaces, and a pointed leading pad edge.

* * * * *